(12) United States Patent
Colley

(10) Patent No.: US 9,342,155 B2
(45) Date of Patent: May 17, 2016

(54) CHARACTER ENTRY APPARATUS AND ASSOCIATED METHODS

(75) Inventor: Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 1031 days.

(21) Appl. No.: 13/076,941

(22) Filed: Mar. 31, 2011

(65) Prior Publication Data
US 2012/0254786 A1 Oct. 4, 2012

(51) Int. Cl.
*G06F 3/048* (2013.01)
*G06F 3/023* (2006.01)
*G06F 3/0488* (2013.01)

(52) U.S. Cl.
CPC .......... *G06F 3/0233* (2013.01); *G06F 3/04883* (2013.01); *G06F 3/04886* (2013.01)

(58) Field of Classification Search
CPC   G06F 3/0233; G06F 3/04886; G06F 3/04883
USPC ........................................................ 715/773
See application file for complete search history.

(56) References Cited

U.S. PATENT DOCUMENTS

| | | | |
|---|---|---|---|
| 5,229,936 A * | 7/1993 | Decker et al. | 704/10 |
| 5,706,450 A * | 1/1998 | Shaiman et al. | 715/210 |
| 5,734,923 A * | 3/1998 | Sagawa et al. | 715/204 |
| 8,077,974 B2 * | 12/2011 | Kumar et al. | 382/186 |
| 8,581,851 B2 * | 11/2013 | Pienimaa | G06F 3/018 345/168 |
| 2002/0123367 A1 * | 9/2002 | Savolainen et al. | 455/550 |
| 2004/0164951 A1 * | 8/2004 | Lun Pun et al. | 345/156 |
| 2004/0196266 A1 * | 10/2004 | Matsuura et al. | 345/169 |
| 2005/0183036 A1 * | 8/2005 | Torii | 715/825 |
| 2006/0119582 A1 * | 6/2006 | Ng et al. | 345/168 |
| 2007/0046633 A1 * | 3/2007 | Hirshberg | 345/168 |
| 2008/0101701 A1 * | 5/2008 | Rainisto | 382/187 |
| 2010/0149190 A1 * | 6/2010 | Yan et al. | 345/467 |
| 2012/0249425 A1 | 10/2012 | Colley | |

OTHER PUBLICATIONS

PalmPilot Handbook, 3Com, available at http://www.hpwebos.com/us/support/handbooks/palmpilothb.pdf, pp. i, ii, 1-5, and 28-39 (1997).*

* cited by examiner

*Primary Examiner* — Doon Chow
*Assistant Examiner* — Conrad Pack
(74) *Attorney, Agent, or Firm* — Alston & Bird LLP

(57) ABSTRACT

An apparatus comprising: a processor; and a memory including computer program code, the memory and the computer program code configured to, with the processor, cause the apparatus to perform the following: detect, from a key user interface of an electronic device, key input of a particular key character from a first set of key characters; detect, from a user-scribe delineation user interface of the electronic device, user-scribed delineation input of a particular delineation character from a second set of delineation characters; wherein the first set of characters comprise grapheme characters and the second set of characters comprises embellishment marks, and wherein the apparatus is configured to associate together the particular key character and the particular delineation character for display.

16 Claims, 5 Drawing Sheets

CHARACTER ENTRY APPARATUS AND ASSOCIATED METHODS

TECHNICAL FIELD

The present disclosure relates to the field of user interfaces for character entry, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Electronic devices may enable character input, for example, to write a text message or email. Conventional solutions provide a keyboard arrangement with a number of keys, wherein each key corresponds to a character. Some keyboards permit characters not directly associated with a single key to be accessed using multiple keys, or using multiple presses of the same key.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
a processor; and
a memory including computer program code,
the memory and the computer program code configured to, with the processor, cause the apparatus to perform the following:
detect, from a key user interface of an electronic device, key input of a particular key character from a first set of key characters;
detect, from a user-scribe delineation user interface of the electronic device, user-scribed delineation input of a particular delineation character from a second set of delineation characters;
wherein the first set of characters comprise grapheme characters and the second set of characters comprises embellishment marks, and wherein the apparatus is configured to associate together the particular key character and the particular delineation character for display.

A user-scribed delineation may be a two dimensional shape which has been scribed/drawn/handwritten by the user.

A character may comprise a standardised symbol (for example a letter or number in a given font). A character may be stored in a memory.

An embellishment mark may be considered to be a mark which augments or modifies one or more grapheme characters. An embellishment may comprise one or more of, for example, a diacritical mark, an accent mark (e.g. an ' ' acute accent, a '' grave accent), overlays (e.g. a '|' bar, a '/' slash and/or a '-' stroke through the character), multiple character marks (over or under a plurality of key characters), an underline and/or a strikethrough. For example the 'tail' of the '@' symbol may be an embellishment mark associated with an 'a' character. The circle around the 'c' grapheme character in the copyright symbol '©' may be an embellishment mark (similarly for the ® registered trademark symbol). Some currency symbols may be considered to be embellished letter grapheme characters e.g. cent—'¢', dollar—'$', yen—'¥', euro '€'.

A user-scribed delineation may comprise a two-dimensional array of pixels. The user-scribed delineation input may comprise a list of pixel positions, the corresponding pixel size and/or corresponding colour.

A user-scribed delineation is a delineation which has been one or more of scribed, hand-written and hand-drawn by a user. A user-scribed delineation may be a delineation which has a shape/form corresponding to the movement and/or position of a scriber under the control of a user when the user is scribing/writing/drawing the delineation. A scribed delineation may be created by a user moving/positioning a scriber, the motion and/or position of which is recognised by the user interface and wherein the resulting delineation corresponds to the motion/position of the scriber. The scriber may, for example, comprise a stylus, a wand, a finger, a hand or a mouse.

A grapheme character may comprise a combination of one or more of a textual character, a letter character (e.g. upper case letter characters, lower case letter characters, from the Roman, Greek, Arabic or Cyrillic alphabets), a graphic character (e.g. a sinograph, Japanese kana or Korean character), an emoticon, a number, a glyph and a punctuation mark.

The first set of grapheme key characters may comprise a combination of one or more of a textual character, a letter character, a graphic character, an emoticon, and a punctuation mark.

The second set of embellishment delineation characters may comprise one or more of a diacritical mark, an accent mark, multiple character marks, an underline and/or a strikethrough.

The first set of key characters and the second set of delineation characters may be mutually exclusive such that the second set of delineation characters are characters which are not immediately available for entry via the keyboard/key user interface. The keys immediately available for entry via the keyboard may be the characters which are indicated by the indicia of the keys of the keyboard/key user interface at the time of input.

Key input may comprise a combination of one or more of:
single-press key input corresponding to a single press of a single key;
multiple-press key input corresponding to multiple presses of a single key; and
multiple-key key input corresponding to single presses of multiple keys.

The apparatus may comprise a user interface which may include a display. The display may be configured to display a virtual keyboard, the virtual keyboard comprising a said key of the electronic device, wherein the virtual keyboard is configured to also produce delineation input in response to user interaction with the virtual keyboard. For example, user interaction with more than one key may be recognised as delineation input, whereas user interaction with a single key may be recognised as key input.

The display may be configured to display a key-press activation region in response to the key being activated, the key-press activation region corresponding to a user-scribe delineation user interface region configured to produce delineation input in response to user interaction. The key-press activation region may be configured to persist a predetermined period of time after the key has been pressed, and/or to disappear in response to a user interaction outside the key-press activation region.

The apparatus may comprise a user-scribe delineation user interface, wherein the user-scribe delineation user interface is configured to detect motion/position of the user to generate user-scribed delineations. In other words, the user-scribe delineation user interface may be configured to detect the motion of the user whilst the user is interacting with the user interface. For example, the user-scribe delineation user interface may comprise a touchpad which is configured to detect the motion/position of the users hand when the user is in contact with the touch pad. Alternatively/additionally, the user-scribe delineation user interface may comprise a mouse. The mouse may be configured to detect motion of itself with respect to the surface it is resting on (e.g. by a rollerball or LED and sensor). As the motion of the mouse corresponds to the motion of the users hand when controlling the mouse, the mouse may be considered to be detecting motion of the user.

As the user-scribe delineation user interface may be configured to use the motion of the user to create an individual user-scribed delineation the solution described herein may allow more intuitive entering of a character.

The user-scribe delineation user interface may comprise, for example, a wand (e.g. from Nintendo Wii™), a touchpad, a touch-screen, a mouse, a motion detector, a position detector and/or an accelerometer.

The user interface may comprise a display, the display comprising:

a key user interface region representing a virtual keyboard, the virtual keyboard comprising a said key of the electronic device; and a separate user-scribe delineation user interface region configured to produce delineation input in response to user interaction.

The apparatus may be configured to:

detect, from a user-scribe delineation user interface of the electronic device, user-scribed delineation input of a particular delineation function from a function set of delineation functions. The delineation function may comprise, for example, capitalise, embolden, underline, change font size, change font, strike-through and/or italicise.

The associated delineation and key characters may correspond to a composite character from a third set of pre-formed composite characters. That is the apparatus may be configured to associate the associated delineation and key characters with a pre-formed composite character (e.g. a composite character which is stored on a memory of the apparatus as a single character before the delineation and key input is entered by the user).

The apparatus may be configured to:

form a composite character comprising a said key input character and a said delineation input character which are associated with consecutively received key input and delineation input; and enable input of the composite character into a textual message.

A formed composite character may be stored in memory as a separate key input character and associated delineation character, or as a single character.

The apparatus may be configured to:

denote an input character as being a key input character and/or a delineation input character, based on at least one of type of character, user selection and frequency of use. For example, an embellishment delineation character may be also denoted as a key character (e.g. a key on a virtual keyboard) based on the frequency of use (e.g. if the user used often).

The association of a delineation input character with a said received delineation input may be configured to be performed using at least one of intelligent character recognition, intelligent word recognition, gesture recognition and handwriting recognition.

Each delineation character may have a corresponding set of delineation input characteristics, in order to associate the delineation input with the corresponding delineation character. For example the delineation input characteristics may comprise one or more of: aspect ratio, percent of pixels above horizontal half point, percent of pixels to right of vertical half point, number of strokes, orientation of strokes, stroke order, spacing between strokes, number of contiguously scribed inputs, average distance from image centre, one or more reflection axis, position of stroke intersections and stroke curvature. Each delineation input characteristics may have an error value to take into account variations in user-scribed delineation input intended to correspond to the same delineation character. A stroke of the user-scribe delineation input may be generated by a single continuous action, and/or number of discrete non-continuous actions within a particular predetermined time.

The apparatus may comprise:

a user-scribe delineation user interface, wherein the user-scribe delineation user interface is configured to detect at least one of motion and position of a scriber to generate user-scribed delineations.

The key user interface and/or the user-scribe delineation interface may comprise a wand, a touchpad, a keyboard, a virtual keyboard, a touch-screen, a stylus and pad, a mouse, a motion detector, a position detector, a scriber or an accelerometer.

The key user interface may comprise, for example, an alphanumeric key input area, a numeric key input area, an AZERTY key input area, a QWERTY key input area or an ITU-T E.161 key input area.

The associated key character and delineation character may form part of a textual message. A textual message may be a combination of one or more of, for example, an SMS message, a MMS message, an email, a document, an address bar entry, a search entry, a URL and a telephone number.

The apparatus may be at least one of a portable electronic device, circuitry for a portable electronic device, a module for a portable electronic device, a laptop computer, a desktop computer, a mobile phone, a Smartphone, a monitor, a personal digital assistant or a digital camera.

The apparatus may be connected to a network. The network may be, for example, the internet, a mobile phone network, a wireless network, LAN or Ethernet. The apparatus may comprise a transmitter and or receiver to interact with a network. The transmitter/receiver may comprise, for example, an antenna, an Ethernet port, a LAN connection, a USB port, a radio antenna, Bluetooth connector, infrared port, fibre optic detector/transmitter.

Memory may comprise, for example, a CD, a DVD, flash memory, a floppy disk, a hard disk, volatile memory, non-volatile memory and/or Random Access Memory.

In a second aspect, there is provided a method, the method comprising:

detecting, from a key user interface of an electronic device, key input of a particular key character from a first set of key characters;

detecting, from a user-scribe delineation user interface of the electronic device, user-scribed delineation input of a particular delineation character from a second set of delineation characters, wherein the first set of characters comprise grapheme characters and the second set of characters comprises embellishment marks; and associating together the particular key character and the particular delineation character for display.

In a third aspect, there is provided a computer program, the computer program comprising computer code configured to:

detect, from a key user interface of an electronic device, key input of a particular key character from a first set of key characters;

detect, from a user-scribe delineation user interface of the electronic device, user-scribed delineation input of a particular delineation character from a second set of delineation characters;

wherein the first set of characters comprise grapheme characters and the second set of characters comprises embellishment marks, and wherein the apparatus is configured to associate together the particular key character and the particular delineation character for display.

The apparatus or processor may be incorporated into an electronic device. The apparatus may be the (portable) electronic device. The electronic devices/apparatus (which may or may not be portable) may provide one or more of audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a in-built digital camera), and gaming functions. The electronic device which may or may not be portable may comprise, for example, a computer (including a laptop), a phone, a monitor, a mobile phone, and/or a personal digital assistant.

The computer program may be stored on a storage media (e.g. on a CD, a DVD, a memory stick or other non-transitory media). The computer program may be configured to run on the device as an application. An application may be run by the device via an operating system.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods/apparatus disclosed are also within the present disclosure and encompassed by one or more of the described embodiments.

As processing such a message as described herein may preclude the need to render/store a message in standard font, it may be more difficult for a third party to electronically query the message (e.g. to search for key words or for private details such as addresses, phone numbers, account details). This may make data transfer/storage more secure.

The apparatus, processor and/or memory may be configured to initiate a messaging, notes or contacts application upon receiving/detecting user-scribe input.

The above summary is intended to be merely exemplary and non-limiting.

Also disclosed is an apparatus comprising:

means for detecting, from a key user interface of an electronic device, key input of a particular key character from a first set of key characters;

means for detecting, from a user-scribe delineation user interface of the electronic device, user-scribed delineation input of a particular delineation character from a second set of delineation characters, wherein the first set of characters comprise grapheme characters and the second set of characters comprises embellishment marks; and means for associating together the particular key character and the particular delineation character for display.

BRIEF DESCRIPTION OF THE FIGURES

A description is now given, by way of example only, with reference to the accompanying drawings, in which:—

DESCRIPTION OF EXAMPLE ASPECTS/EMBODIMENTS

Figure 1:
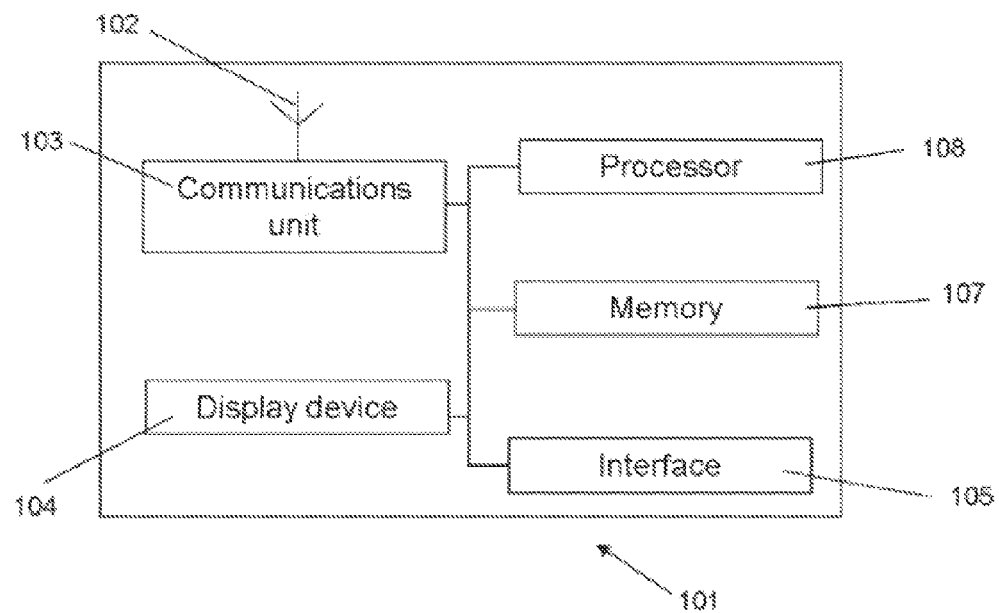
FIG. 1 depicts an embodiment comprising a number of electronic components, including memory, a processor and a communication unit.

For the sake of convenience, different embodiments depicted in the figures have been provided with reference numerals that correspond to similar features of earlier described embodiments. For example, feature number 1 can also correspond to numbers 101, 201, 301 etc. These numbered features may not have been directly referred to within the description of these particular embodiments. These have still been provided in the figures to aid understanding of the further embodiments, particularly in relation to the features of similar described embodiments.

It is common for a user to use an electronic device to enter characters using a user interface, for example, to write a text message, enter a search term, or write a letter. In order to enter characters, conventional user interfaces have utilised keys which correspond to characters. When the user presses a key, the corresponding character is entered. Nevertheless, the keyboard presented may limit the number of characters available. In particular, a conventional QWERTY keyboard may not facilitate the direct entry of embellishment marks or accented characters, such as 'ø', 'é', 'ö', 'ç' and 'å'. To enter embellished characters, previous solutions have relied on repeatedly pressing the same key (e.g. multi-tap text messaging), pressing multiple keys simultaneously or consecutively (e.g. 'Alt' key codes), or changing the mode of the device to show alternative keyboards. These solutions rely on the user having knowledge of how to access the characters not provided directly by the displayed keyboard. For example, the amount of special characters may be large and require several additional keyboard views through which the user must search to find the required character. This issue may be more acute in devices with restricted user interfaces, for example, in portable electronic devices such as mobile phones and/or PDAs, or for languages which use a significant number of embellishment marks (e.g. diacritical marks).

Another solution has been to use handwriting recognition. However, a robust system for recognising characters has proved problematic, particularly when using a finger to enter the text (finger input being a common way of interacting with a touch-screen device). Hand writing recognition generally places strict requirements on the user's accuracy/formatting, and typically need a additional information to distinguish between delineations of similar characters e.g. between the accented letter 'á' and the accented letter 'â'. Furthermore, many users prefer keyboard-based touch-screen input rather than handwriting-recognition based input.

Example embodiments contained herein may be considered to provide a way associating, for display, embellishment marks entered via user-scribed delineation input with grapheme characters entered via keys.

FIG. 1 depicts an embodiment (101) of an apparatus, such as a mobile phone, comprising a display device (104) such is for example, a Liquid Crystal Display (LCD). In other embodiments, the apparatus (101) may comprise a module for a mobile phone (or PDA or audio/video player), and may just comprise a suitably configured memory (107) and processor (108).

The apparatus (101) of FIG. 1 is configured such that it may receive, include, and/or otherwise access data. For example, this embodiment (101) comprises a communications unit (103), such as a receiver, transmitter, and/or transceiver, in communication with an antenna (102) for connecting to a wireless network and/or a port (not shown) for accepting a physical connection to a network, such that data may be received via one or more types of networks. This embodiment comprises a memory (107) that stores data, possibly after being received via antenna (102) or port or after being generated at the user interface (105). The user interface may allow a user to scribe one or more individual user-scribed delineations. The processor (108) may receive individual user-scribed delineations from the user interface (105), from the memory (107), or from the communication unit (103). Regardless of the origin of the data, these data may be outputted to a user of apparatus (101) via the display device (104), and/or any other output devices provided with apparatus. The processor (108) may also store the data for later user in the memory (107). The memory (107) may store computer program code and/or applications which may be used to instruct/enable the processor (108) to perform functions (e.g. generate/delete or process data).

Figure 2:
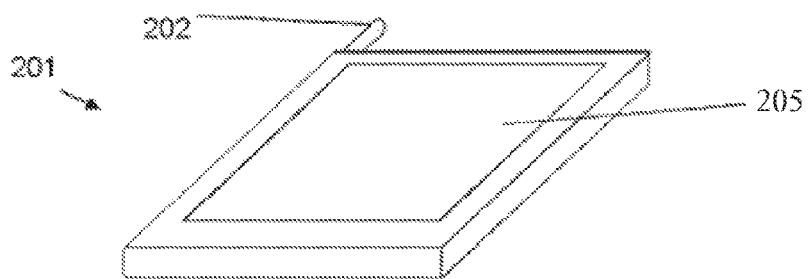
FIG. 2 illustrates an embodiment comprising a touch-screen.

FIG. 2 depicts an embodiment of the apparatus comprising a portable electronic device (201), e.g. such as a mobile phone, with a user interface comprising a touch-screen user interface (205), a memory (not shown), a processor (not shown) and an antenna (202) for transmitting data (e.g. a message comprising entered characters). The portable electronic device is configured to allow the user to scribe a delineation by tracing the desired shape with his/her finger on the screen (when the device is configured to be in a scribing mode). It will be appreciated that in other suitably adapted embodiments the delineations may be scribed using a mouse, a stylus, a touch pad or a keyboard.

Figure 3A:
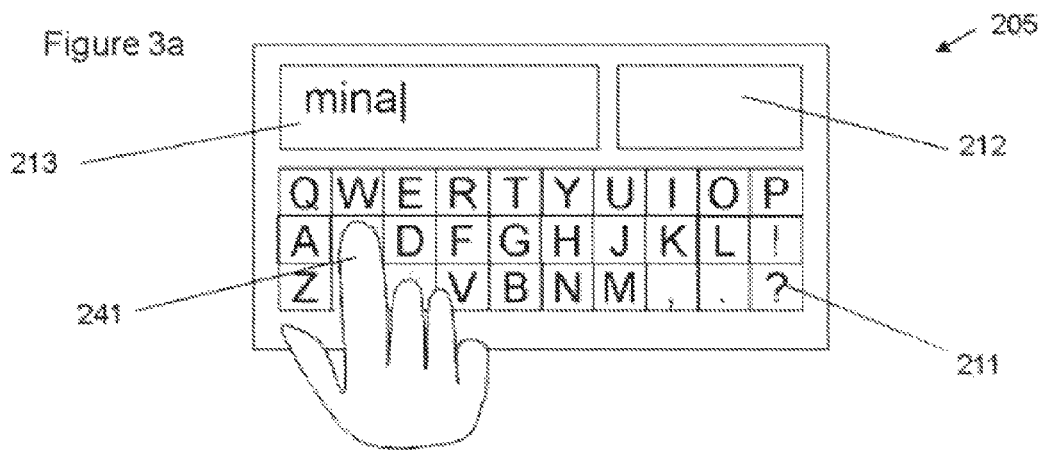
FIG. 3a-c illustrates the views of the touch-screen as a user inputs a message.
Figure 3B:
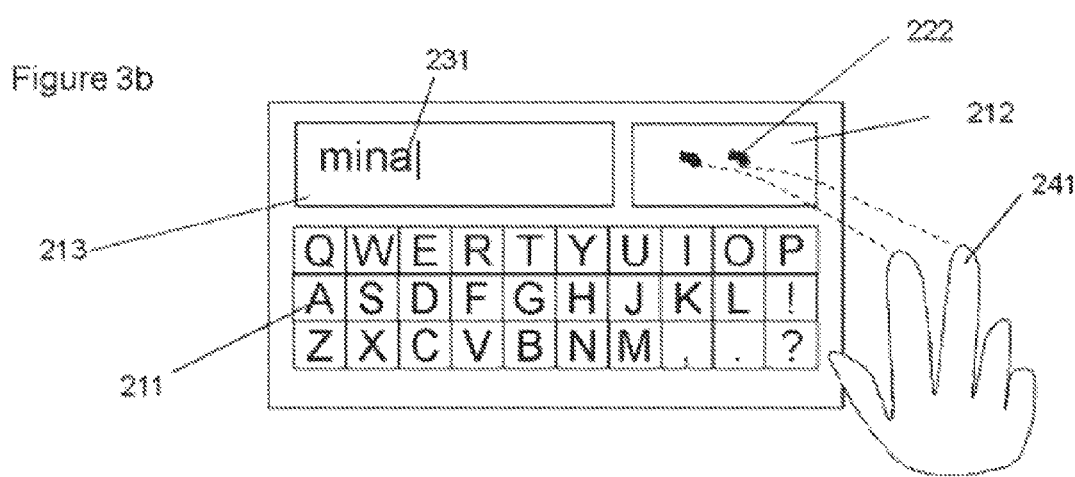
Figure 3C:
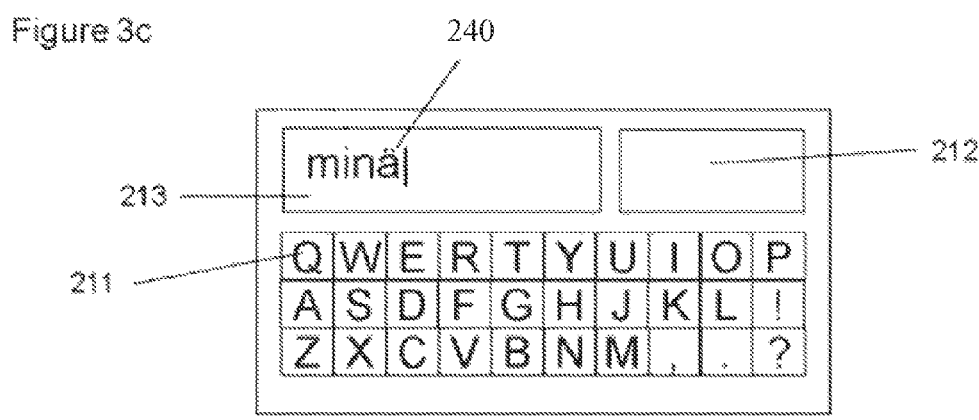

FIG. 3a-c illustrates a series of views of the touch-screen user interface when the device is in use. In this example, the user wants to write a message comprising the word 'mina' and send it, via a network (e.g. mobile phone network, internet, LAN or Ethernet), to a friend. To facilitate scribing such a message, this embodiment has an input mode wherein the touch-screen user interface (205) is divided into three regions: a key user interface (211) which in this case is a virtual keyboard having, for example, letter keys a-z arranged according to the QWERTY layout; a user-scribe delineation user interface (212) which is responsive to touch; and an entered character region (213). The user-scribe delineation user interface (212) of the screen is where the user can scribe a delineation by moving his finger (241) (i.e. the user's finger is the scriber in this example) across the screen. The entered character region (213) of the touch-screen user interface (205) is configured to display an arrangement of the characters already entered into the device (e.g. via the user-scribe delineation user interface (212) and key user interface (211)). The key user interface (211) region displays a number of touch buttons or keys which the user can activate by pressing in order to enter a corresponding character.

In some example embodiments, the key user interface region (211) and the user-scribe delineation interface occupy substantially the same area of the touch-screen user interface.

FIG. 3a depicts the touch-screen of the user interface as the user is entering characters, in this case, into a textual message. This embodiment is configured to detect, from the key user interface region (211) of the touch-screen user interface (205) of an electronic device, key input of a particular key character from a first set of key characters. In this case the first set of grapheme key characters comprise the letters 'a'-'z', and the punctuation marks '?', '.', ',' and '!' For example, when the user activates the key 'a' of the key user interface region (211), the apparatus is configured to generate corresponding key input corresponding to the letter 'a', and input the letter 'a' into the entered character field (213). FIG. 3a depicts the situation where the user has activated the series of keys corresponding to the characters making up the word 'mina' (i.e. without the umlaut on the 'a' at this stage). These characters are then displayed in the entered character region (213) of the touch-screen user interface (205).

This embodiment is configured to detect, from a user-scribe delineation user interface (212) of the electronic device, user-scribed delineation input of a delineation character from a second set of delineation characters. The second set of delineation characters in this case comprises the delineation characters '' (umlaut), ' ' (acute), '' (grave) and '^' (circumflex). In other examples the set of delineation characters may be different. In this case the delineation characters are diacritical embellishment marks. In this case the first and second sets of characters comprise respective mutually exclusive sets of characters in the sense that the virtual keyboard would not immediately allow entry of diacritical embellishment marks without changing to an embellishment mark mode, for example. Depicted in FIG. 3b, is touch-screen user interface (211) as the user is scribing a delineation corresponding to the umlaut delineation character ''. The apparatus in this case is configured to determine the delineation characters corresponding to the delineation input using handwriting recognition (by correlating the input with the second set of characters). It will be appreciated that for other embodiments, one user-scribed delineation may correspond to multiple delineation characters.

In this case, in order to recognise the user scribed delineation input as a delineation character, each delineation character has a corresponding set of delineation input characteristics. In this example, the set of delineation input characteristics define that the user-scribe delineation input corresponding to the '¨' umlaut delineation character has two strokes, wherein the strokes lie on a substantially horizontal line and are symmetric about a substantially vertical plane. It will be appreciated that other embodiments may use different sets of characteristics to recognise the same delineation character.

When the delineation characters corresponding to the scribed delineation (222) have been determined (following character recognition) they are entered into the entered character region of the user interface. In this way, the apparatus is configured to associate together the particular key character and the particular delineation character for display. In this embodiment the entered diacritical embellishment mark (240) is associated with the previously entered key (231) character. In this embodiment, the entered key character and the entered delineation character are entered separately, and are stored in memory as distinct characters. That is, the key character and the associated delineation character may be independently edited subsequently (for example the accented entered composite character 'a' may be changed to the accented entry 'a' by highlighting the '{umlaut over ( )}' umlaut delineation character and changing it to an ' ' acute delineation character, without editing the 'a' key character). Storing the key character and the delineation characters separately may allow more permutations of key characters and delineation characters. The pre-stored characters may require less storage space.

The entered 'ä' character may be considered to be a formed composite character comprising an 'a' key character and an '¨' umlaut delineation character.

It will be appreciated that for other embodiments the delineation character will be entered first by the user and the corresponding diacritical embellishment mark will be associated with the next entered key character.

It will be appreciated that for other embodiments, the user-scribe delineation user interface (211) may be displayed along with the user-scribe delineation user interface (212), or the apparatus may be configured to enable the user to switch between the two, by key or stroke action on the user interface. It will be appreciated that the scribing region may overlap with the keyboard, for example it may be entirely contained within the keyboard. For example, gestures which contact more than one key may be recognised as user-scribed delineation input, and gestures which activate only one key may be recognised as key input.

It will be appreciated that other embodiments may comprise physical buttons/keys in place of or in addition to touch buttons/keys provided on a touch-screen.

Figure 4A:
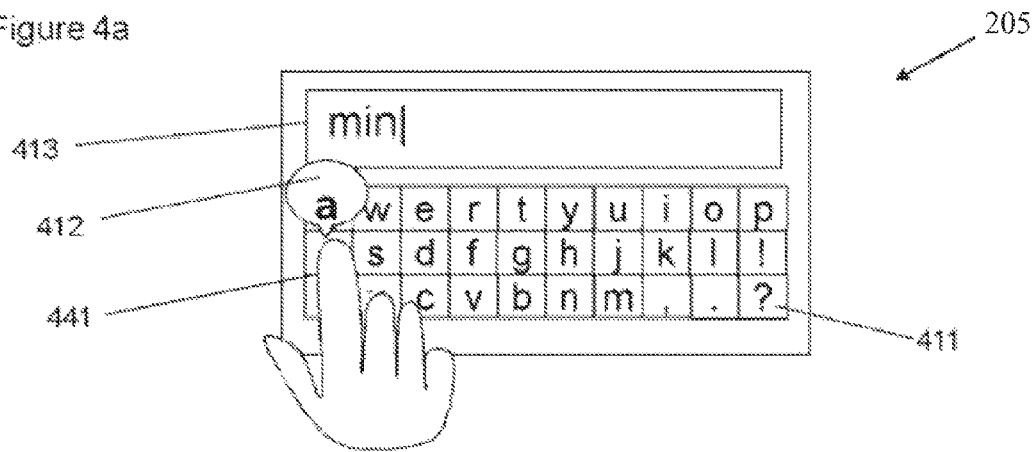
FIG. 4a-c illustrates the views of the touch-screen of a further embodiment as a user inputs a message.

FIG. 4a depicts the screen of a further embodiment of the apparatus comprising a portable electronic device. Like the previous embodiment, this embodiment comprises a user interface comprising a touch-screen user interface (205), a memory (not shown), a processor (not shown) and an antenna (not shown) for transmitting data (e.g. a message comprising entered characters). The portable electronic device is configured to allow the user to scribe a delineation by tracing the desired shape with his/her finger on the screen (when the device is configured to be in a scribing mode). It will be appreciated that in other suitably adapted embodiments the delineations may be scribed using a mouse, a wand, a stylus, a touch pad or a keyboard.

Figure 4B:
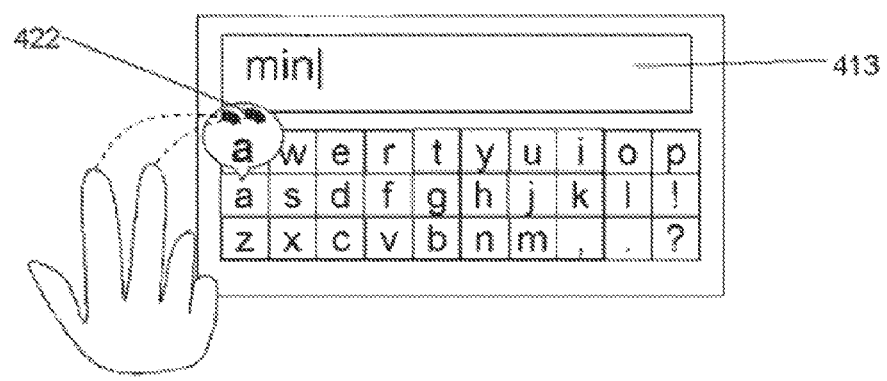
Figure 4C:
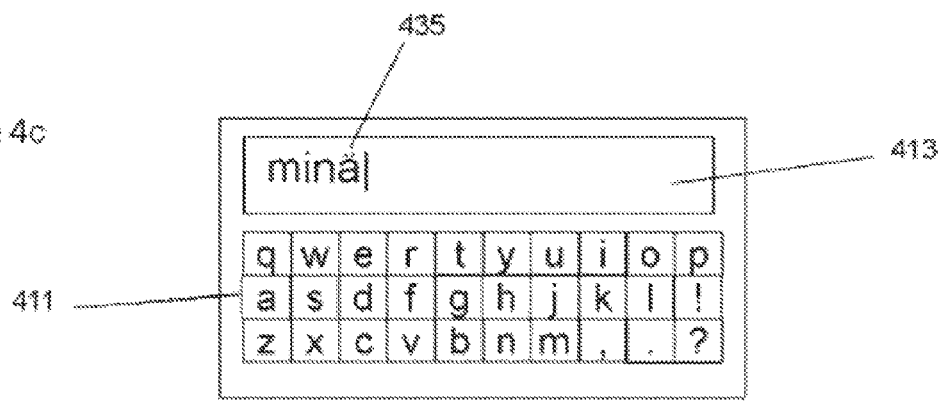

FIG. 4a-c illustrates a series of views of the touch-screen user interface when this device embodiment is in use. In this example, as for the previous example, the user wants to write a message comprising the word 'mina' and transmit it via a network (e.g. mobile phone network, internet, LAN or Ethernet). Like the previous embodiment, to facilitate scribing such a message, this embodiment has an input mode wherein the touch-screen user interface (205) is divided into regions, the regions including a key user interface (411) which in this case is a virtual keyboard having, for example, grapheme letter keys a-z arranged according to the QWERTY layout and an entered character region (413). Unlike the previous embodiment, for this embodiment, the user-scribe delineation user interface region appears in response to a key being pressed.

FIG. 4a depicts the touch-screen (205) of the user interface as the user is entering characters, in this case, into a textual message. FIG. 4a depicts the situation where the user has activated the series of keys corresponding to the characters 'min'. In this case the first set of key characters comprise the letters 'a'-'z', and the punctuation marks '?', '.', ',' and '!'. For example, when the user activates the key 'a' of the key user interface region (411), the apparatus is configured to generate corresponding key input corresponding to the letter 'a'. However, unlike the previous embodiment wherein the key character was immediately displayed in the entered character field, in this case the entered character is displayed in a key-press activation region positioned above the pressed key. The key-press activation region in this case provides a user-scribe delineation user interface region (412) configured to produce delineation input in response to user interaction. In this case the key-press activation region is displayed for a predetermined period of time after the key has been activated, thereby allowing the user to remove the scriber from the screen and place it within the key-press activation region to enter input corresponding to a delineation character. It will be appreciated that the key-press activation region positioned independently of the pressed key (e.g. in the middle of the screen regardless of which key has been pressed), or within the entered character region. It will be appreciated that the key-press activation region may or may not display a representation of the corresponding key character.

This embodiment is configured to detect, from a user-scribe delineation user interface (412) of the electronic device, user-scribed delineation input (422) of a delineation character from a second set of delineation characters. The second set of delineation characters in this case comprises the delineation characters '¨' (umlaut), ' ' (acute), '` ' (grave) and '^' (circumflex). In this case the delineation characters are diacritical embellishment marks. Depicted in FIG. 4b, is touch-screen user interface (411) as the user is scribing a delineation corresponding to the umlaut delineation character '¨'. The apparatus in this case is configured to determine the delineation characters corresponding to the delineation input using handwriting recognition (by correlating the input with the second set of characters). It will be appreciated that for other embodiments, one user-scribed delineation may correspond to multiple delineation characters.

The user then provides user-scribed delineation input (422) by touching the screen within the user-scribe delineation user interface region (412). The scriber in this case is the user's fingers (441). In this case, in order to recognise the user scribed delineation input as a delineation character, each delineation character has a corresponding set of delineation input characteristics. For this embodiment, the delineation input characteristics comprise the position of the user-scribed delineation input with respect to the key character displayed within the key-press activation region. In this example, the set of delineation input characteristics define that the user-scribe delineation input corresponding to the ¨ umlaut delineation character has two strokes, wherein the strokes lie on a substantially horizontal line and are positioned above the key-press activation region key character. It will be appreciated that other embodiments may use different sets of characteristics to recognise the same delineation character (432).

In this case, the device is configured to associate the combination of the 'a' key character and the ¨ umlaut delineation character with the pre-formed composite 'ä' character from a set of combination characters (unlike the previous embodiment where the composite character was formed when the entered key character and delineation character are associated for display). That is, in this case, the composite characters are formed prior to the user entering key and delineation input. That is the composite 'ä' character (435) comprises the 'a' key character and the ¨ umlaut delineation character. In this way, the apparatus is configured to associate together the particular key character and the particular delineation character for display. Associating combinations of a key character and a delineation character with one of a predetermined set of combination characters may make the delineation recognition more robust. For example if the only combination character in the set of combination characters comprising the key character 'i' was the letter character 'ï' (i.e. an 'i' key character with an umlaut delineation character), the device would not need to distinguish between the delineation characters ¨ (umlaut) and ' ' (acute) when the key input corresponding to the letter 'i' was entered (as shown in FIG. 4c).

When the delineation characters corresponding to the scribed delineation have been determined (following character recognition) the associated combination character is entered into the entered character region.

It will be appreciated that in other embodiments, the key-press activation region will appear only when the user is interacting with the screen. In this case the user would slide the scriber to the key-press activation region in order to provide user-scribed delineation input. Other embodiments may change the mode of the device to a delineation mode in response to activating a key, wherein in the delineation mode any user input is recognised as user-scribed delineation input. The delineation mode may persist for a predetermined period of time after the key being activated.

Figure 5A:
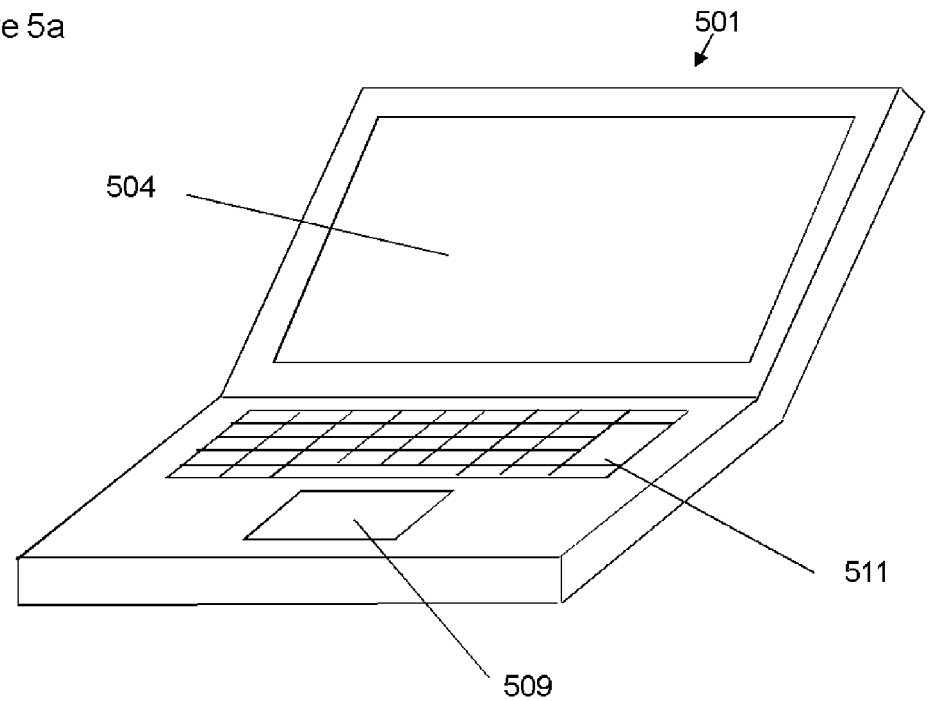
FIG. 5a illustrates an embodiment comprising a physical keyboard and touchpad.

FIG. 5a illustrates a further embodiment (501) of an apparatus such as a personal digital assistant device comprising a user interface, the user interface comprising a touchpad (509), a key user interface (511) which, in this case, is a physical keyboard. This embodiment further comprises a screen (504); a processor and memory (not shown). Unlike the apparatus of FIG. 2 in which the user interface and the display functions were both provided by a touch-screen, in this embodiment these functions are provided by a screen (504), a physical keyboard (511) and a touchpad (509). In this example, the user wishes to type the message "Café?".

In this case, the key input comprises single-press key input corresponding to a single press of a single key of the physical keypad, and multiple-key key input corresponding to single presses of multiple keys.

The key characters corresponding to single-press key input comprise lower-case letters of the Latin alphabet, 'a' to 'z' and the space character.

The screen area (504) provides a user-scribe delineation user interface region (512), with which the user can interact using the touchpad (509) via a cursor (541) to generate user-scribed delineation input (522, 524).

Figure 5B:
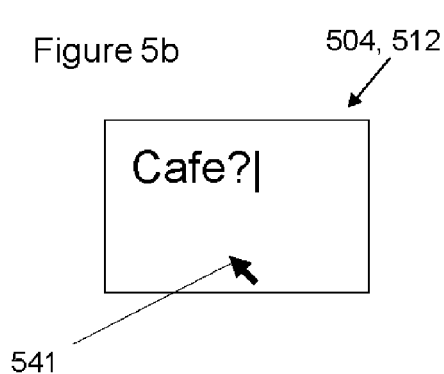
FIG. 5b-e illustrates the views of a screen of a further embodiment as a user inputs a message.

The screen (504) of the embodiment of FIG. 5a is shown in FIG. 5b as the user is composing the message. The user has activated the keys of the key user interface physical keyboard (511) to enter the characters corresponding to the message 'Cafe?' (note that, at this stage, the message is not underlined and comprises the standard key character 'e' rather than the accented character 'é'). In order to add the accent to the key character 'e', the user scribes a user-scribed delineation (522) of the acute accent above the entered 'e' key character.

The second set of delineation characters for this embodiment comprises diacritical embellishment mark delineation characters, such as and ¨, ' ' and ¨, an underline embellishment mark and a strikethrough embellishment mark. The first list of key characters and the second list of delineation characters are, in this case, mutually exclusive. It will be appreciated that for other embodiments, the first set of key characters and the second set of delineation characters may not be mutually exclusive.

In this case the device is configured to associate the delineation character with a key character based on the position of the user-scribed delineation input with respect to the entered characters. In this case the user scribed delineation input is scribed above the 'e' key character, so the device associates the key character with the 'e' character (e.g. by using the touchpad (509) to appropriately position the cursor (541) above the 'e' prior to scribing the accent above the 'e').

Figure 5C:
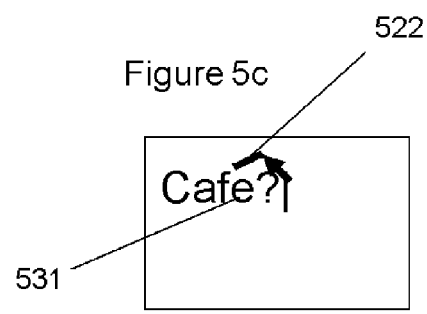

In this case, the user generates user-scribed delineation input by pressing and dragging his finger across the touchpad whilst pressing a physical delineation button. When the delineation button is pressed the movement of the cursor (541) corresponds to the user scribed delineation. When the delineation button is not being pressed, the cursor can be moved without generating delineation input. The user-scribed delineation (522) scribed by the user is depicted in FIG. 5c. In this case, the apparatus recognises the user-scribed delineation input as corresponding to the delineation character by virtue of the shape of the scribed stroke specified by delineation input characteristics.

In this case, the delineation input characteristics also comprise the position of the user-scribed delineation input with respect to the key character displayed within the key-press activation region. In this example, the set of delineation input characteristics define that the user-scribe delineation input corresponding to the ' ' acute delineation character has one contiguous inclining stroke, and is positioned above the entered key character. It will be appreciated that other embodiments may use different sets of characteristics to recognise the same delineation character.

Figure 5D:
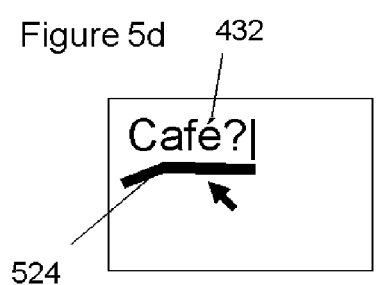

When the delineation character has been recognized the apparatus is configured to enter the character into the entered character region of the display, thereby associating together the entered key characters (531) and the entered delineation characters (522) for display. This is depicted in FIG. 5d.

This embodiment is also configured to detect, from the user-scribe delineation user interface of the electronic device, user scribed delineation input of a particular delineation character, wherein the delineation character is an embellishment mark associated with a number of key characters. In this case the delineation embellishment marks comprise the 'underline' and 'strikethrough' stokes. As shown in FIG. 5d, the user has entered user-scribed delineation input (524) corresponding to the delineation character 'underline'. In this case the device is configured to recognise the delineation character on the basis of the shape and position of the delineation input with respect to the entered characters. In this example, the set of delineation input characteristics define that the user-scribe delineation input corresponding to the underline delineation character has one contiguous substantially horizontal stroke, and is positioned below a plurality of entered key characters. It will be appreciated that other embodiments may use different sets of characteristics to recognise the same delineation character. It will be appreciated that for other example embodiments, the delineation character may be applied only to highlighted characters.

Figure 5E:
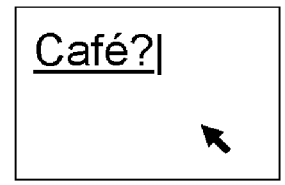

When the delineation character has been recognised the apparatus is configured to apply the function to the characters in the entered character region of the display. This is depicted in FIG. 5e.

It will be appreciated that other embodiments may be configured to detect, from a user-scribe delineation user interface of the electronic device, user-scribed delineation input of a particular delineation function from a function set of delineation functions. The set delineation functions may comprise, for example, capitalise, embolden and/or italicise. For example, the user may highlight one or more entered characters and enter a delineation corresponding to a delineation function. The embodiment, in this case would recognise the entered delineation input and apply the associated delineation function to the highlighted characters. In this way, the user could convert characters input as plain text to, for example, italicised characters.

Advantages of the disclosed apparatus/method may include that the most commonly used characters can be directly selected using the keys. It also may allow the scriber delineation to be more robust as only delineation characters may be searched. It may also give immediate access to a wide variety of embellishment mark characters on, for example, a small or otherwise limited user interface.

Advantages over a full handwriting recognition solution may include that it is more practical to use with fingers rather than a stylus as the user is required, for example, to input only occasional strokes and characters with delineation recognition. It may also be more tolerant of individual users stroke analysis and may not require any additional mode switching (e.g. between number and letter modes for delineation recognition). As the number of delineation characters is limited the delineation recognition may be more accurate.

Advantages over a keyboard only solution may include that the user interface is more intuitive and allows faster and more natural input of special characters. For example, the user may not have to search through several pages of keyboard characters (or different keyboard modes) to find the required character. In addition, complex characters comprising several constituent elements (e.g. emoticons) may be input as a single character. It may also enable faster and more natural input in languages that require the use of character diacritical mark modifier strokes.

Figure 6:
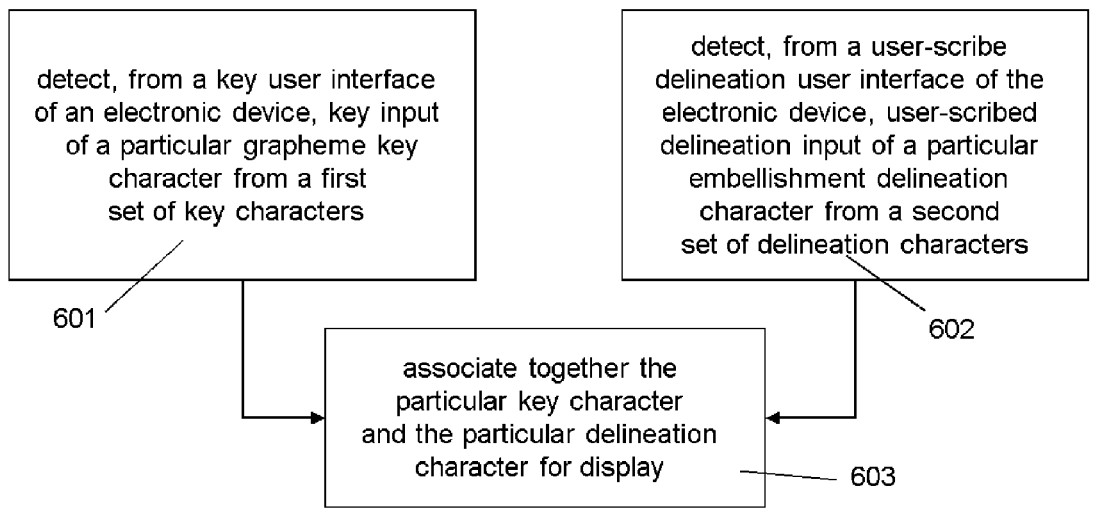
FIG. 6 depicts a flow diagram describing the method used to store/transmit a composite image.

FIG. 6 shows a flow diagram illustrating the association of a key character and a delineation character for display. As shown by operation 601, the electronic device is configured to detect, from a key user interface of an electronic device, key input of a particular grapheme key character from a first set of key characters. As shown by operation 602, the electronic device is configured to detect, from a user-scribe delineation user interface of the electronic device, user-scribed delineation input of a particular embellishment delineation character from a second set of delineation characters. As shown by operation 603, the electronic device is configured to associate together the particular key character and the particular delineation character for display.

Figure 7:
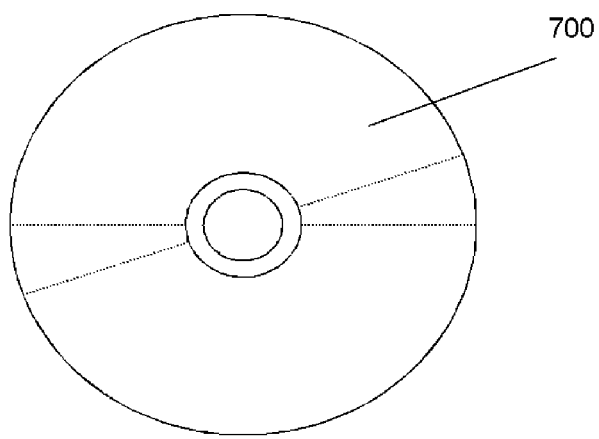
FIG. 7 illustrates schematically a computer readable media providing a program according to an embodiment of the present invention.

FIG. 7 illustrates schematically a computer/processor readable media 700 providing a program comprising computer code which implements one or more of the aforementioned embodiments. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   a processor; and
   a memory including computer program code, the memory and the computer program code configured to, with the processor, cause the apparatus to perform the following:
   detect, from a key user interface of an electronic device, key input from a user of a particular key character from a first set of key characters, wherein the first set of characters comprises grapheme characters; and
   detect, from a user-scribe delineation user interface of the electronic device, user-scribed delineation input from the user of a particular delineation character from a second set of delineation characters, wherein the second set of characters comprises embellishment marks which augment or modify one or more grapheme characters of the first set of key characters;
   associate together the particular key character and the particular delineation character to determine a particular composite character from a third set of composite characters, wherein the third set of composite characters comprises pre-formed composite characters, each of the pre-formed composite characters stored on the memory as a single character before the detected key input and the detected delineation input; and
   enter the particular composite character into an entered character region for display such that the particular delineation character is displayed in a predefined positional relationship to the particular key character within the particular composite character, wherein the particular key character and the particular delineation character displayed in the predefined positional relationship to the particular key character are configured such that the particular key character and the particular delineation character displayed in the predefined positional relationship to the particular key character are independently editable by the user subsequent to display of the particular composite character.

2. The apparatus of claim 1, wherein the apparatus comprises a display, the display configured to display a key-press activation region in response to activation of a key, the key-press activation region corresponding to a user-scribe delineation user interface region configured to produce delineation input in response to user interaction.

3. The apparatus of claim 1, wherein the apparatus is configured to:
   form a different composite character for storing in the third set of pre-formed composite characters, the different composite character comprising an entered key input character and an entered delineation input character which are associated with consecutively received key input and delineation input; and
   enable input of the different composite character into a textual message.

4. The apparatus of claim 1, wherein the user interface comprises a display, the display configured to:
   display a key user interface region representing a virtual keyboard; and
   a separate user-scribe delineation user interface region configured to produce delineation input in response to user interaction.

5. The apparatus of claim 1, wherein the user interface comprises a display, the display configured to:
   display a key user interface region representing a virtual keyboard,
   wherein the virtual keyboard is configured to produce delineation input in response to user interaction with the virtual keyboard.

6. The apparatus of claim 1, wherein the association of a delineation input character with a said received delineation input is configured to be performed using at least one of gesture recognition and handwriting recognition.

7. The apparatus of claim 1, wherein the apparatus comprises:
   a user interface, wherein the user interface is configured to detect at least one of motion and position of a scriber to generate user-scribed delineations.

8. The apparatus of claim 1, wherein the user interface comprises a wand, a touchpad, a touch-screen, a mouse, a motion detector, a position detector, a scriber or an accelerometer.

9. The apparatus of claim 1, wherein the key user interface comprises an alphanumeric key input area, a numeric key input area, an AZERTY key input area, a QWERTY key input area or an ITU-T E.161 key input area.

10. The apparatus of claim 1, wherein the associated key character and delineation character form part of a textual message.

11. The apparatus of claim 1, wherein the first set of grapheme key characters comprises a combination of one or more of a textual character, a letter character, a graphic character, an emoticon, and a punctuation mark.

12. The apparatus of claim 1, wherein the second set of embellishment delineation characters comprises one or more of a diacritical mark, an accent mark, multiple character marks, an underline and/or a strikethrough.

13. The apparatus of claim 1, wherein the key input comprises a combination of one or more of:
   single-press key input corresponding to a single press of a single key;
   multiple-press key input corresponding to multiple presses of a single key; and
   multiple-key key input corresponding to single presses of multiple keys.

14. The apparatus according to claim 1, wherein the apparatus is at least one of a portable electronic device, circuitry for a portable electronic device, a module for a portable electronic device, a laptop computer, a desktop computer, a mobile phone, a Smartphone, a monitor, a personal digital assistant or a digital camera.

15. A method comprising:
- detecting, from a key user interface of an electronic device, key input from a user of a particular key character from a first set of key characters, wherein the first set of characters comprises grapheme characters;
- detecting, from a user-scribe delineation user interface of the electronic device, user-scribed delineation input from the user of a particular delineation character from a second set of delineation characters, wherein the second set of characters comprises embellishment marks which augment or modify one or more grapheme characters of the first set of key characters;
- associating together the particular key character and the particular delineation character to determine a particular composite character from a third set of composite characters, wherein the third set of composite characters comprises pre-formed composite characters, each of the pre-formed composite characters stored on memory as a single character before the detected key input and the detected delineation input; and
- entering the particular composite character into an entered character region for display such that the particular delineation character is displayed in a predefined positional relationship to the particular key character within the particular composite character, wherein the particular key character and the particular delineation character displayed in the predefined positional relationship to the particular key character are configured such that the particular key character the particular delineation character displayed in the predefined positional relationship to the particular key character are independently editable by the user subsequent to display of the particular composite character.

16. A computer program product, the computer program product comprising at least one non-transitory computer-readable storage medium having computer-executable code instructions stored therein configured to:
- detect, from a key user interface of an electronic device, key input from a user of a particular key character from a first set of key characters, wherein the first set of characters comprises grapheme characters;
- detect, from a user-scribe delineation user interface of the electronic device, user-scribed delineation input from the user of a particular delineation character from a second set of delineation characters, wherein the second set of characters comprises embellishment marks which augment or modify one or more grapheme characters of the first set of key characters;
- associating together the particular key character and the particular delineation character to determine a particular composite character from a third set of composite characters, wherein the third set of composite characters comprises pre-formed composite characters, each of the pre-formed composite characters stored on memory as a single character before the detected key input and the detected delineation input; and
- enter the particular composite character into an entered character region for display such that the particular delineation character is displayed in a predefined positional relationship to the particular key character within the particular composite character, wherein the particular key character and the particular delineation character displayed in the predefined positional relationship to the particular character key are configured such that the particular key character and the particular delineation character displayed in the predefined positional relationship to the particular key character are independently editable by the user subsequent to display of the particular composite character.

* * * * *